UNITED STATES PATENT OFFICE.

ALFRED L. CONNORS AND FRANCIS A. RUTLEDGE, OF WOODY, CALIFORNIA.

POLISH AND COLOR REVIVER AND PRESERVATIVE.

1,356,128.  Specification of Letters Patent.  Patented Oct. 19, 1920.

No Drawing.  Application filed March 19, 1920. Serial No. 367,118.

*To all whom it may concern:*

Be it known that we, ALFRED L. CONNORS and FRANCIS A. RUTLEDGE, citizens of the United States, residing at Woody, in the county of Kern and State of California, have invented new and useful Improvements in Polish and Color Revivers and Preservatives, of which the following is a specification.

Our invention relates to a polish and color reviver and preservative especially suited for polishing automobiles and the like, although the same is also an excellent furniture polish.

It is an object of our invention to compound a polish which produces a high gloss of the surfaces to which it is applied and which also revives the color of varnishes or paints of old and faded surfaces. Furthermore, the polish will renew the life of the varnished or painted surfaces and prevent cracking or chipping. Our invention consists of the composition hereinafter described and claimed.

Our polish is compounded as follows:

| | |
|---|---|
| Petroleum jelly | $9\frac{1}{2}$ oz. |
| Lard oil | $\frac{1}{2}$ oz. |
| Mutton fat, rendered | $\frac{1}{4}$ oz. |
| Beef fat, rendered | $\frac{1}{4}$ oz. |
| Boiled linseed-oil | $\frac{1}{2}$ oz. |
| Cotton seed oil | 1 oz. |
| Whites of eggs | $3\frac{1}{8}$ oz. |

The quantities stated will make one pound of the polish. The ingredients are thoroughly mixed and whipped to form a cream and the polish is applied to the surfaces to be polished in the usual manner. Changes may be made in the proportions of the ingredients as stated, but the best results will be obtained by adhering closely thereto.

The essential ingredients of our polish are petroleum jelly, cotton seed oil, and the white of eggs. Some of the other ingredients, or all of them, may be omitted.

Various changes may be made without departing from the spirit of our invention as claimed.

We claim:

1. A polish and color reviver and preservative for automobiles and the like, comprising petroleum jelly, cotton seed oil and white of eggs.

2. A polish and color reviver and preservative for automobiles and the like, comprising petroleum jelly, cotton seed oil, white of eggs and linseed oil.

3. A polish and color reviver and preservative for automobiles and the like, comprising petroleum jelly, cotton seed oil, white of eggs, linseed oil and lard oil.

4. A polish and color reviver and preservative for automobiles and the like, comprising petroleum jelly, cotton seed oil, white of eggs, linseed oil, lard oil, and beef fat and mutton fat.

5. A polish and color reviver and preservative for automobiles and the like, comprising the following ingredients in the proportions stated: Petroleum jelly $9\frac{1}{2}$ ounces; lard oil $\frac{1}{2}$ ounce; mutton fat, rendered, $\frac{1}{4}$ ounce; boiled linseed oil $\frac{1}{2}$ ounce; cotton seed oil 1 ounce; albuminous or white part of eggs $3\frac{1}{8}$ ounces.

In testimony whereof we have signed our names to this specification.

ALFRED L. CONNORS.
FRANCIS A. RUTLEDGE.